(12) United States Patent
Waters (10) Patent No.: US 6,390,372 B1
(45) Date of Patent: May 21, 2002

(54) CARDS WITH READING LENSES

(76) Inventor: Michael Waters, 372 Bateman Cir. North, Barrington Hills, IL (US) 60010

( * ) Notice: Subject to any disclaimer, the term of this patent is extended or adjusted under 35 U.S.C. 154(b) by 0 days.

(21) Appl. No.: 09/797,398

(22) Filed: Mar. 1, 2001

(51) Int. Cl.[7] ............................................... G06K 19/00
(52) U.S. Cl. ...................................... 235/487; 235/488
(58) Field of Search ................................ 235/487, 488

(56) References Cited

U.S. PATENT DOCUMENTS 6,176,430 B1 * 1/2001 Finkelstein et al. ......... 235/487

* cited by examiner

*Primary Examiner*—Harold I. Pitts
(74) *Attorney, Agent, or Firm*—Fitch, Even, Tabin & Flannery (57) ABSTRACT

A reading card is provided including at least one reading lens which is smaller in size than the card member and is carried thereby. The card member has the size of a typical credit card such that it can be readily fit into the sleeve or holder used for these cards in wallets, and the like. Preferably, the lens is of a material and configuration so that it is provided with a well-defined or sharp diopter rating to allow a user to select among reading cards each with different diopter lenses for their particular needs. The lenses are carried by the card member so that additional space is left thereon for placement of, for example, indicia and a magnetic strip such as in credit, debit, and phone cards.

22 Claims, 5 Drawing Sheets

CARDS WITH READING LENSES

FIELD OF THE INVENTION

The invention relates to cards and, more particularly, to cards that provide a viewing enhancement function.

BACKGROUND OF THE INVENTION

Cards that people carry about in their wallets or purses issued by financial, retail and other consumer-orientated businesses for transmitting information relating to an individual carrying the card have become ubiquitous for enabling efficient transactions to occur in all sorts of daily applications. Credit cards are perhaps the most common type of such cards which allow purchases to be made without the need to pay cash for the items charged to the card. Similarly, debit cards and telephone cards allow consumers to use the cards in lieu of money to pay for items or calls, respectively, by drawing down the money deposited to a specified account tied to the card. In all of these cards, there is typically information encoded such as on a magnetic strip of the card relating to the identity of the card owner and/or which allows the status of the account associated with the card to be determined.

With telephone cards, public transportation or train cards, etc. the holder can add value to the card by feeding the card into a machine that accepts money and adds the indicated amount to the card. The holder of the card uses it by running the card through the card reader that detects the amount added to the card as encoded on the magnetic strip and deducts the amount needed to effect the transaction for which it is being used. One problem noted with these cards is that once the holder uses up the amount they have added to the card, typically rather than retaining the so called "empty" card for future use by adding money thereto as described, they simply discard the empty card and obtain a new one when needed and add the money to the new card at the time it is obtained and thereafter as is convenient. Accordingly, this raises cost to the card issuer as they need to increase the number of cards they produce to satisfy this need created by those who do not retain their cards when the value added thereto has been exhausted.

With a great many of cards, there generally is paperwork that is generated by their use. For example, with use of credit cards, an invoice is created that has to be read and signed by the user. Where the credit card is used in a restaurant, the amount is of particular importance as that determines the tip for the service provider that has to be calculated. Another example is prescription cards that are provided to the pharmacist for example, before a prescription is filled. In this instance, the label on the bottle indicates the type of medicine contained therein, the dosage and frequency at which the medicine is to be used, and various warnings regarding its use. These labels are typically fairly small with associated small print thereon to fit on the small bottles. Because the patients obtaining prescriptions are often elderly people, the prescription labels are usually very difficult to read without use of reading glasses. Other examples of where cards are employed in a context where reading can become important is with telephone cards where the user may need to refer to a telephone book and a vehicle warranty card provided with a vehicle owners manual.

The typical pair of eyeglasses are usually provided with a soft or hard case so that they can be carried about when not in use. Where people need glasses for reading or do not like to wear their glasses all the time, the cases are an important accessory as they protect them from damage. One problem with these cases is in their size as they have to be large enough to accommodate the glasses with their temple arms folded against the lenses. Thus, the cases are slightly larger than the size of a standard folded-up pair of reading glasses. The size of the cases does not permit them to be readily fit into most pockets on clothing. Accordingly, absent some sort of carrying bag or pouch for holding the case, eyeglasses that are used only periodically such as for reading, are usually left at home and thus, not otherwise available for their owners. Thus, despite the need, many card holders do not have reading glasses with them when needed such as in conjunction with use of their cards, as described above.

A Fresnel lens has been provided in the shape of long bookmarks having a length of approximately seven and a half inches as well as in the shape of rectangular cards of the credit card type size. The Fresnel lenses in these relatively large forms are a flat, thin piece of plastic material in which a series of small concentric stepped grooves are formed to produce raised prism ridges in the plastic material. Fresnel lenses are not particularly well suited for viewing enhancement such as for reading print like the typical lens used with reading glasses. Instead, Fresnel lenses are typically used in applications where magnification is the most important consideration over all others. In this regard, Fresnel lenses as reading lenses are typically not used because of their poor optics in terms of resolution creating blurring or distorted vision in their use. In this regard, the diopter rating for Fresnel lenses is not very well defined and can vary somewhere in the range of four to six, which generally is several orders beyond that needed for reading lenses. Another drawback of the high-power magnification provided by Fresnel lenses is that the focal length and field of view of the lens is not as desirable as it is with a typical lens for reading. With high-powered Fresnel lenses not only is resolution poor, but the lens needs to be held further from the eyes for proper focus and the high magnification and diopter rating they provide decreases the field of view beyond that which is desired when reading. Also, Fresnel lenses usually are formed of a relatively soft, plastic material such as PVC that can readily be pressed for forming the requisite ridges of the Fresnel lens. The soft plastic material renders Fresnel lenses particularly deficient as reading lenses as from a practical standpoint, these types of lenses are handled frequently and when they are formed with a soft plastic material will tend to more easily be scratched or marred as a result thereof.

Accordingly, there is a need for a card that allows for the reading of materials generally associated therewith without the need for a separate pair of reading glasses to be available. More particularly, a card that allows the owner to use the card for reading much in the manner of a pair of reading glasses would be desired.

SUMMARY OF THE INVENTION

In accordance with the present invention, a reading card is provided that has a size akin to that of a credit card and can be fit in a sleeve or holder that is incorporated into a wallet. In this manner, a separate pair of reading glasses and case therefor are not needed to provide precision viewing enhancement for a user. Instead, the present reading card can be carried in a space savings manner in a cardholder's wallet and when removed therefrom can be used for transactions, identification purposes and the like while also providing the holder with precision viewing enhancement. More particularly, the reading card has at least one reading lens which is smaller in size than the card member and is carried thereby and preferably has a configuration to provide it with a well-defined diopter rating so that the card can be adapted to a user's specific reading needs based on their eyesight deficiency, unlike the poor optics provided by Fresnel lenses.

A low-profile or surface mount light or LED can also be incorporated in the reading card so that the viewing area can be illuminated for enhanced reading, particularly in dimly lit locations. Other features incorporated into the present reading card can include a low-profile voice recorder/playback device and calculator features including low-profile keys and a display. All of these added electronic features do not add significantly to the size, and in particular the thickness of the present card thus adding significant value to the card while also keeping its compact size for carrying purposes. Where the card is used by paying to add cash value to the card, the reading lens and above-described electronic features will increase the likelihood that the holder will not discard the card when empty thus reducing costs to card issuers. Magnets can be attached to the card to allow the card to be placed on a metallic support surface, e.g. refrigerator door, when not in use.

DETAILED DESCRIPTION OF THE PREFERRED EMBODIMENTS

Figure 1:
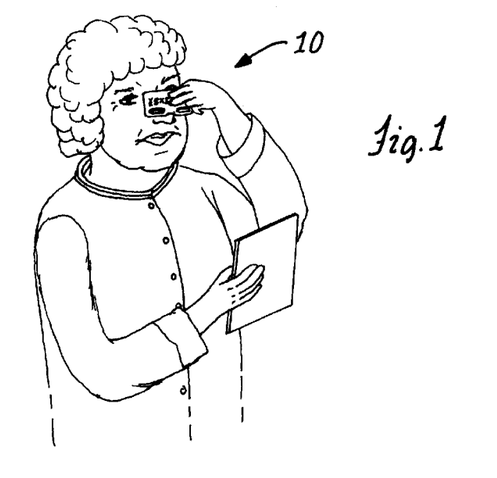
FIG. 1 is a perspective view showing a reading card in accordance with the present invention being employed by a user to read text material.
Figure 2:
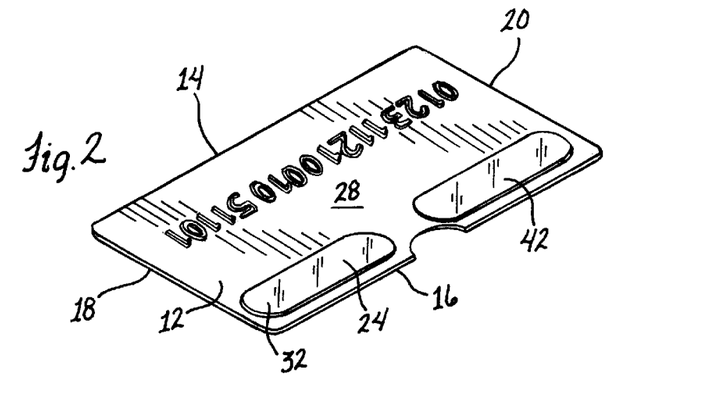
FIG. 2 is a perspective view of the reading card showing a pair of reading lenses disposed along a long edge of the card with a bridge-notch intermediate the lenses, and raised indicia on one of the card surfaces.
Figure 3:
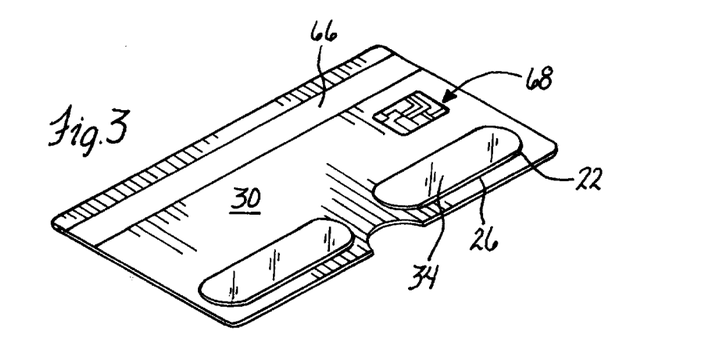
FIG. 3 is a perspective view of the reading card showing a magnetic strip and a microchip on one of the card surfaces.
Figure 4:
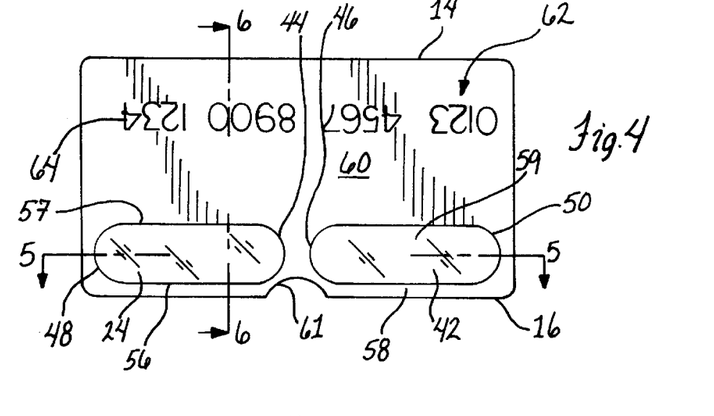
FIG. 4 is an elevation view of the card of FIG. 2.

In FIG. 1, the present reading card 10 is shown in use for reading of text. As shown, the user can hold the card 10 close to their eyes with one hand while their other hand holds the material to be read. Referring to FIGS. 2–4, it can be seen that the reading card 10 includes a card member 12 having a generally rectangular configuration similar to that of a standard credit card. In this regard, the card member 12 has a pair of long edges 14 and 16 extending generally parallel to each other and interconnected at their ends by a pair of short edges 18 and 20 also extending generally parallel to each other. Together, the edges 14–20 define the outer periphery of the reading card 10.

In accordance with the invention, the card member 12 includes at least one inner edge 22 that is distinct from the outer edges 14–20. The inner edge 22 is spaced inwardly of the card outer edges 14–20 and forms a window 23 in the card member 12 for receipt of at least one reading lens 24 therein. Preferably, the inner edge 22 forms the window without cooperation with the outer edges 14–20. In other words, while the edge 22 can open to one of the outer edges 14–20, it is preferred that it is a closed edge 22 that does not intersect with the card peripheral edges 14–20. In this manner, outer edge 26 of the reading lens defining the outer periphery thereof will be spaced from the card member edges 14–20.

The card member 12 preferably is of a relatively rigid material, such as plastic to provide it with a thickness akin to that of a credit card. In this regard, the card member 12 includes opposite parallel surfaces 28 and 30 having a predetermined spacing therebetween under approximately $\frac{1}{16}$", and preferably approximately 1.25 mm, again similar to that common to credit cards.

The reading lens 24 of the reading card 10 herein is of a predetermined configuration to provide the lens with a well-defined diopter rating. The reading lens 24 includes opposite light refracting surfaces 32 and 34 each having a substantially smooth configuration across their entire extent with no grooves or the like formed therein. The reading lens 24 is of the type that corrects for defects in vision which is due to errors of refraction in the human eye and thus, at least one of the surfaces will normally be curved to precisely correct for the defect being addressed in a particular individual that wishes to use the reading card 10 herein. A variety of lens types may be utilized including concave, convex, plano-convex, cylindrical, compound lenses and/or bi, tri, or tetrofocal lenses, although the reading card 10 is preferably adapted for use by those who are farsighted so that convexly configured lenses 24 will typically be employed. As mentioned, the preferred convex lens 24 will have a well-defined diopter rating for providing precision optics and high resolution for a user reading text therewith. In practice, lenses with diopter ratings of 1.5, 2.0 and 2.5 are employed.

Figure 12A:
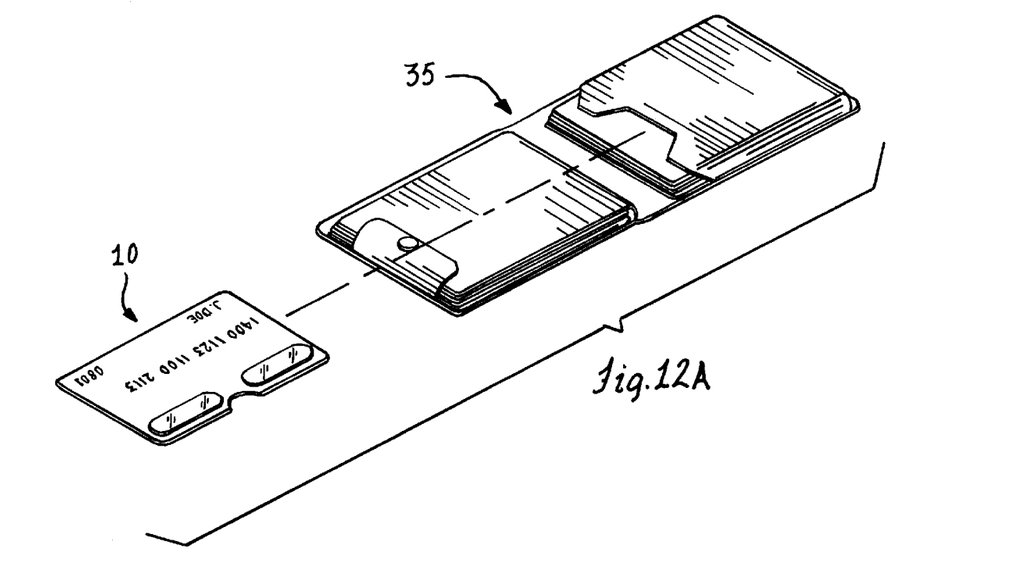
FIGS. 12A and 12B are perspective views of the reading card and a wallet and sleeve card holder thereof.

In the preferred and illustrated form, the spacing between the lens surfaces 32 and 34 is predetermined to be only slightly greater than that between the card member surfaces 28 and 30. In this manner, the card member 12 can retain its thin profile, such as for fitting in a wallet 35 (FIG. 12A) while providing the lens 24 with a thickness necessary to provide the precision optics thereof and a secure connection to the card member 12, as described further herein. Preferably, the lens 24 is of an acrylic polycarbonate material which is a special plastic having a refractive intensity or index. This allows the thickness of the lens 24 to be kept to a minimum while still providing the magnification and high quality optics desired. In addition, the acrylic polycarbonate material is hard and durable, and has good scratch resistance properties.

For fitting the reading lens 24 into the card member window bounded by the inner edge 22 in a secure manner, the card member inner edge 22 and the reading lens outer edge 26 are provided with a snap-fit interface or connection therebetween. More specifically and referring to FIG. 7, the lens 24 has opposing flanges 35 and 36 bounding a groove 37 formed in body 38 of the lens at the outer edge 26 thereof by a fixturing and cutting apparatus 100 (FIG. 14), described more fully hereinafter. This provides the groove 37 with a general U-shaped configuration, albeit having flat sides 37a and a flat bottom or base 37b interconnecting the sides 37a. The card member edge 22 has an end surface 40 extending in a generally perpendicular direction to the card surfaces 28 and 30. The end surface 40 is disposed in the groove 37 facing the base 37b thereof with the lens 24 attached in the window 23 of the card member 12 such that the card member edge 22 is held captive between the lens flanges 35 and 36 tightly engaged on card member surfaces 28 and 30.

Figure 7:
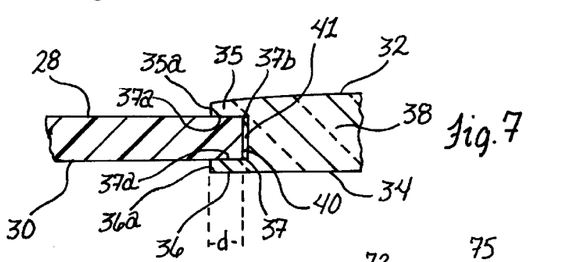
FIG. 7 is a cross-sectional, fragmentary view of the snap-fit interface between one of the lenses and card member.

To insert the lens 24 in the window 23, it is initially noted that while the card member 12 is preferably of a relatively rigid plastic material such that it does not flex or bend absent some force being applied thereto, it is not nearly as rigid as the preferred lens material, namely the acrylic polycarbonate polymer material previously specified. As shown in FIG. 7, there is an interference between the edge 22 of the card member 12 about window 23 thereof and the lens flanges 35 and 36 over the distance, d. Accordingly, for snap-fitting the lens 24 in the window 23, either the card edge 22 or flanges 35 or 36 or a combination of both resiliently shift to allow the edge end 40 to clear one of the flange ends 35a or 36a. While it may be possible to generate some flexibility of flanges 35 or 36 due to their reduced thickness over the remainder of the lens body 38, generally the card edge 22 will undergo the majority, if not all of the flexing necessary to resiliently shift the end surface 40 over the distance, d, due to the differences in the rigidity of the card member material versus the lens body material. Once the end surface 40 clear one of the flange ends 35a and 36a depending on the direction of insertion of the lens, the card edge 22 will resiliently rebound to its undeformed configuration and be captively held between the flanges 35 and 36, as previously described.

As shown, it is preferred that there be a gap 41 between the card end face 40 and the groove base 37b with the lens 24 snap-fit in the card member window 23. This obviates the tolerance problem of having the lens surface 37b potentially bearing so tightly against the card surface 40 that this engagement introduces tension forces into the card member 12 tending to distort or warp its shape from the desired flat configuration thereof. Such warping of the card member 12 can create instabilities in the retention of the lens 24 in the window 23 eventually causing it to pop-out therefrom.

Figure 7A:
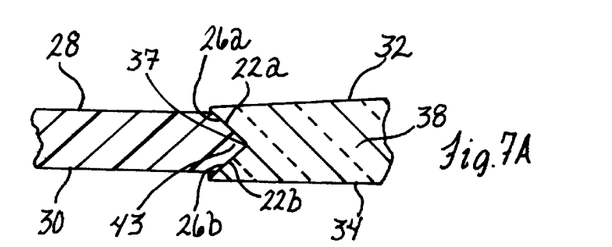
FIG. 7A is a view similar to FIG. 7 showing an alternative snap-fit interface.

In an alternate form depicted in FIG. 7A, the card member edge 22 and reading lens edge 26 include cam surface portions including portions 22a and 22b of the card edge 22 and portions 26a and 26b of the lens edge 26. As shown, the edge portions 22a and 22b extend obliquely away from the card member surfaces 28 and 30, respectively, and meet at their juncture to define a v-projection 43 at the card member edge 22. Similarly, the lens edge portions 26a and 26b extend obliquely relative to the lens surfaces 32 and 34, respectively, albeit in a direction inward relative to the body 38 of the lens and meet so as to define groove 37 as having an inwardly oriented v-shape at the reading lens edge 26 and to interfit with the v-projection 43.

The lens 24 can be attached to the card member 12 by inserting it into the window 23 formed by the card edge 22 from a direction either from above the card top surface 28 or below the card bottom surface 30. In the first instance, the reading lens 24 will cam against the card edge portion 22a at the juncture between the lens bottom surface 34 and the edge portion 26b thereof with the card material being sufficiently resiliently flexible to deflect until the aforedescribed juncture of the lens 24 clears the deflected tip of the v-projection 36 of the card member 12. At this time, the v-projection 43 will snap into place in the v-groove 37 with the card member surface portions 22a and 22b in confronting, tight fitting relation to the corresponding lens surface portions 26a and 26b, as shown in FIG. 7. Similarly, if the lens 24 is inserted into the window of the card member 12 in the direction from below the card member surface 30, it is the juncture of the lens top surface 32 and surface portion 26a thereof that cams against the card member surface portion 22b to cause the necessary deflection of the tip of the v-projection 43 for snap-fitting of the lens 24 into place, as described. In either direction, the snap-fit connection provides for easy assembly of the lens 24 to the card member 12.

While the v-projection 43 and v-groove 37 can be reversed as to whether one is on the card member 12 or the lens 24, it is preferred to have the projection 43 formed on the thinner card member 12 and the groove 37 on the thicker lens 24, as described hereinafter. To form the card member inner edge 22, the card member 12 can be molded with an insert in place having a v-groove substantially matching that of the lens groove 37. Alternatively, the card member 12 can be stamped from the top and bottom with there being top and bottom punches that cooperate to form the card edge surface portions 22a and 22b.

Figure 14:
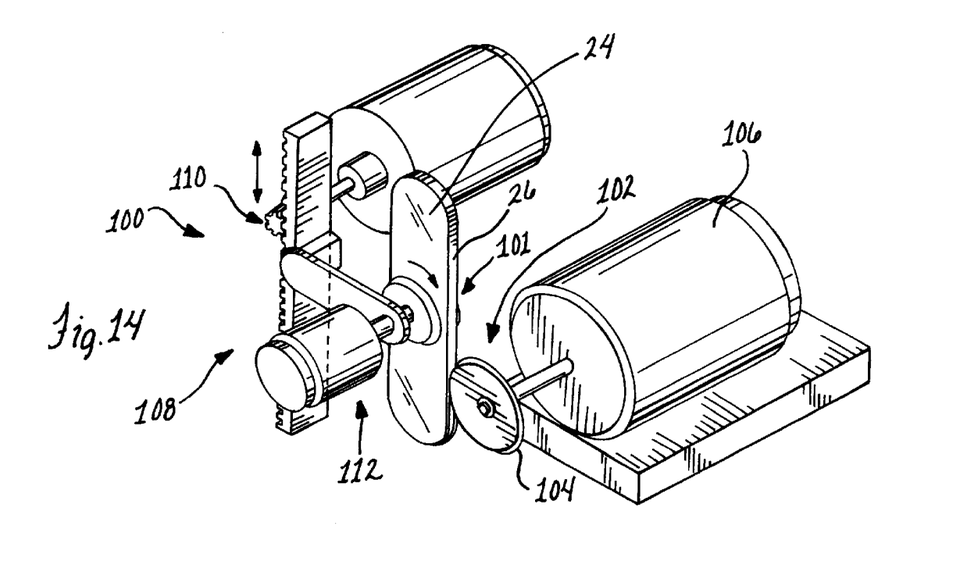
FIG. 14 is a perspective view of a lens fixture and cutting apparatus showing a groove being formed about the outer edge of the lens.

For forming the v-groove 37 in the reading lens body 38, the lens body 38 can be mounted in the fixture 101 that holds the lens approximately at its center so that the outer edge 26 is free and clear for engagement by a cutting wheel 102. The cutting wheel 102 can have a v-projection substantially matching that of the projection 43 formed at the card edge 22 so that when it is run along the lens edge 26 in a cutting operation, it forms the v-groove 37 therein which has a closely matching complimentary shape to the configuration of the card member v-projection 43.

In the preferred form shown in FIG. 7, the card member edge 22 can be formed in a simpler single-action stamping operation as compared to process for forming the v-projection 43 by way of a punch having a shape corresponding to that of window 23 with a straight side surface to form the end surface 40. With respect to the cutting wheel 102, it will have a cutting periphery 104 matching either the u-shape of the groove 37 of lens 24 shown in FIG. 7 or a v-shape as mentioned for forming the groove 37 shown in FIG. 7A.

The lens groove 37 can be machined by shifting and rotating the lens 24 in a precision path about the stationary cutting wheel 102 driven for rotation by motor drive 106 therefor. Shifting the lens 24 can be accomplished by a drive system 108 that can include, for example, a rack and pinion assembly 110 and a rotary drive 112 that cooperate to produce the desired shifting of the lens 24 in the precision path for bringing the lens edge 24 into proper engagement with the cutting wheel edge 104 about the entire extent of the edge 24.

Figure 5:
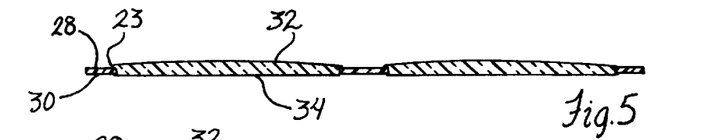
FIG. 5 is a cross-sectional view taken along line 5—5 of FIG. 4 showing the relative thickness between the lenses and the card member.
Figure 6:
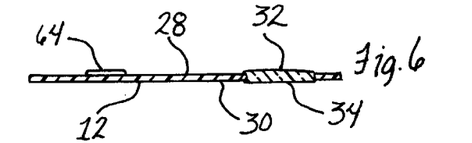
FIG. 6 is a cross-sectional view taken along line 6—6 showing one of the indicia being raised relative to the card member surface.

As can be seen in FIGS. 5–7, when the reading lens 24 is snap-fit in the window 23 formed by the inner edge 22 of the card member 12, the thinner card member 12 will have its top and bottom surfaces 28 and 30 recessed slightly from the corresponding top and bottom surface 32 and 34 of the thicker reading lens 24. As the reading lens 24 will generally be of a more rigid material, e.g. glass, than that of the card member 12 and the fact that it is desirable to maintain the card member 12 to a thickness akin to that of a credit card for fitting in a wallet, the greater thickness provided to the reading lens body 38 will be advantageous so that there is more material to be precisely configured to tailor the eyesight correction it provides in terms of light is refracted therethrough. In addition, the thicker lens 38 will allow it to be easily precision cut about its peripheral edge 26 to form either the u-shaped or v-shaped groove 37 therein via the cutting wheel 102, as described above.

Figure 10:
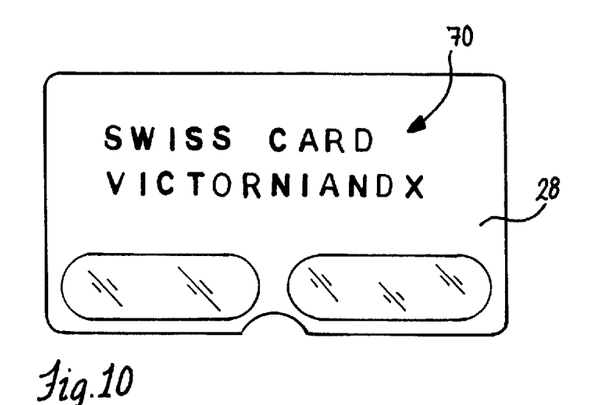
FIG. 10 is an elevation view of the reading card showing advertising-type written material included thereon.

It is preferred that the reading card 10 be provided with a pair of reading lenses including reading lens 24 and an identical reading lens 42. As can be seen in FIGS. 4 and 10, it is preferred that the pair of lenses 24 and 42 be disposed closer to one of the long edges 14 or 16 of the reading card 10 than the other. In the illustrated form, the lenses 24 and 42 have an elongate, obround configuration so that their length runs parallel to the edge 16. The lenses 24 and 42 preferably have a length of slightly less than one and a half inches and are spaced from each other at their facing arcuate ends 44 and 46 by slightly less than one quarter of an inch so that when the reading card 10 is held closely adjacent to ones face, i.e. on the order of two to three inches, the lenses 24 and 42 generally will be disposed in alignment along the line of sight between the user and the item being read. For this purpose, a notch 61 having an arc-shape can be formed intermediate the lenses 24 and 42 along the card edge 16. The notch 61 allows a user to rest the card 10 comfortably and in an easily maintained position high on the bridge of their nose to keep the lenses 24 and 42 in the desired position close to the users face similar to where reading glass lenses would be located which optimizes the vision correction and field of view provided thereby.

The lenses 42 and 44 preferably have a transverse width of slightly less than one half of an inch between the respective long sides 56 and 57, 58 and 59 thereof. For spacing the lenses 24 and 42 closely adjacent to the edge 16, their long sides 57 and 59 are preferably spaced approximately 0.675" from the card edge 16. The illustrated and preferred card 10 has a length of approximately three inches along the edges 14 and 16, and even more preferably 3.35 inches, and a width along the edges 18 and 20 of approximately two inches, and more preferably 2.13 inches. Thus, in the preferred and illustrated reading card 10, the spacing of the lens sides 57 and 59 0.675" from the card edge 16 leaves a large space 60 over the remainder of the card 10, i.e. on the order of approximately one and a half inches to the edge 14 and the entire length of the card between the edges 18 and 20 for receiving indicia 62 thereon.

Figure 12B:
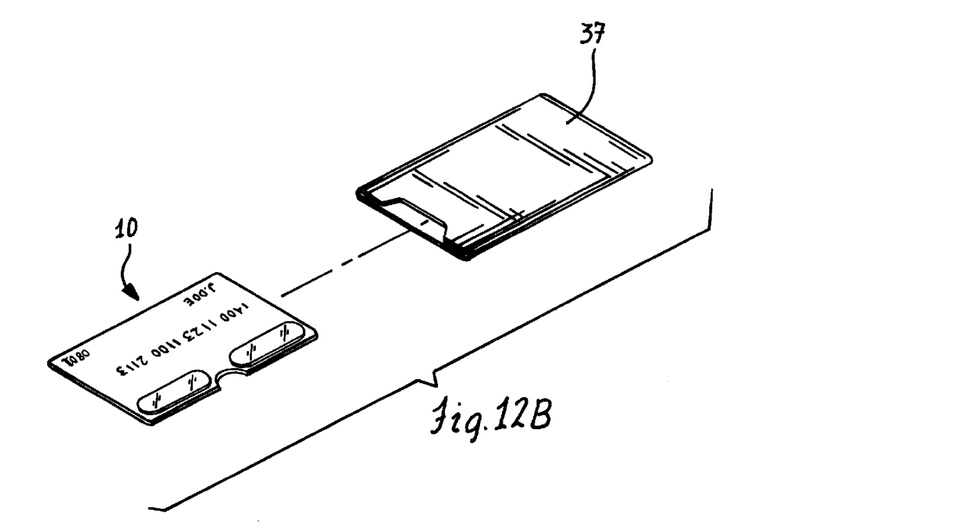

The indicia 62 can take the form of raised numbers and/or letters generally designated 64 which can be formed integrally in either one of the card member surfaces 28 and 30. As shown in FIGS. 2, 4 and 6, the raised indicia 64 formed in card member surface 28 will be those that are typically found on credit cards, such as to specify the name of the card holder, the expiration date of the card, and the account number, and which are run through a machine for creating an invoice having this information shown thereon. As is apparent, the small space required of the reading lenses 24 and 42 on the card member 12 enables the remaining space 60 on the card member 12 to be sufficiently large to include these typical fields of information that are normally provided on a credit card while still providing a user the added benefit of the reading enhancement function with the present reading card 10. In this manner, the invoice that is generated by use of the reading/credit card 10 herein can be easily read by an individual who is farsighted without the need to carry a separate pair of eyeglasses and a case therefor. Instead, the present reading/credit card 10 can be utilized and when the transaction is complete and the user has finished viewing the information they need to read, the card 10 can be replaced in the user's wallet 35 such as via a sleeve card holder 37 thereof (FIGS. 12A and 12B) or the like in a compact space savings manner.

The reading card 10 also will have a magnetic strip which generally will be on the surface opposite that of the raised indicia 64 as in a typical credit card, and as shown in FIG. 3 on surface 30. The magnetic strip 66 can be formed in film layer that is laminated onto the card member 12 and is encoded with machine readable information that when read links to that of a central processing station of the credit card provider to allow the retailer to obtain information regarding whether or not the status of the particular account associated with the card 10 will enable the transaction to take place, i.e. whether the account is in good standing or not.

The reading card 10 can also include a microchip 68 and power source therefor integrated into the card member 12 so as to provide a "smart" type card that includes greater data storage capacity than otherwise available via the magnetic strip 66. The microchip 68 can store additional information unique to the card holder such as their driver's license number, social security number, medical information, etc.

Figure 8:
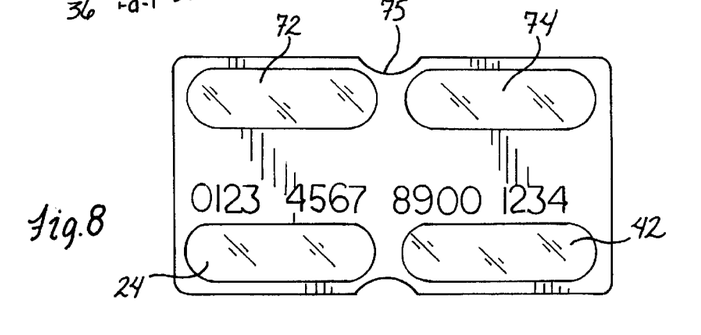
FIG. 8 is an elevational view of an alternative form of the reading card having two pairs of reading lenses carried thereby.

In addition to using the space 60 on the card for the raised indicia 64 as described, the indicia can include information specific to the card issuer, such as indicia 70 that is printed on one of the card surfaces 28 or 30 for providing advertising and/or trade name information relating to the issuer, as shown in FIG. 10.

Where the amount of space 60 for the indicia 64 and/or 70 is not as important, the card 10 can be provided with two pairs of reading lenses 24 and 42 and 72 and 74, respectively, all having substantially identical construction so that the user can read with the card 10 with either of bridge pieces 61 or 75 along respective long edges 16 and 14 resting on the bridge of their nose.

Figure 9:
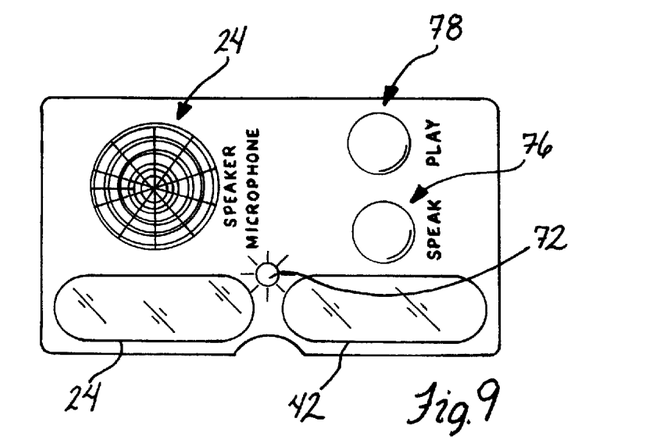
FIG. 9 is an elevational view of another reading card in accordance with the present invention showing a low-profile light and voice record/playback device thereon.

In FIG. 9, the reading card 10 is shown as including low-profile electronic devices incorporated therein. More specifically, the reading card 10 can include a light source in the form of a surface mount LED 72 generally disposed in the area between the lenses 24 and 42. In this manner, when a user activates the LED 72, the viewing area or field of view provided by the lenses 24 and 72 will be illuminated for enhanced viewing performance particularly where lighting is not as good as desired, such as can occur in restaurants where the reading/credit card 10 may be used. Also, a surface mount speaker/microphone 74 and surface mount speak and play switches 76 and 78 can be integrated into the card to provide it with a voice recorder/playback device or digital memo recorder. In this manner, the reading card 10 can be used while reading to provide vision enhancement while also allowing one to record their thoughts as they come to them, such as based on the just read subject matter for playback at a later, more convenient time. In this form of the card 10 shown in FIG. 9, there is no need for a stand-alone light or memo recorder and the space and costs this entails. The previously described microchip 68 can be used for digitized recording of the user's voice, and all of the low-profile devices 72–78 can be powered from a single power source in the card 10. The electrical interconnections for these devices can be embedded in the card member 12 or they can be mounted to a thin, printed circuit board including interconnection circuitry for lamination to the card member 12.

Figure 11:
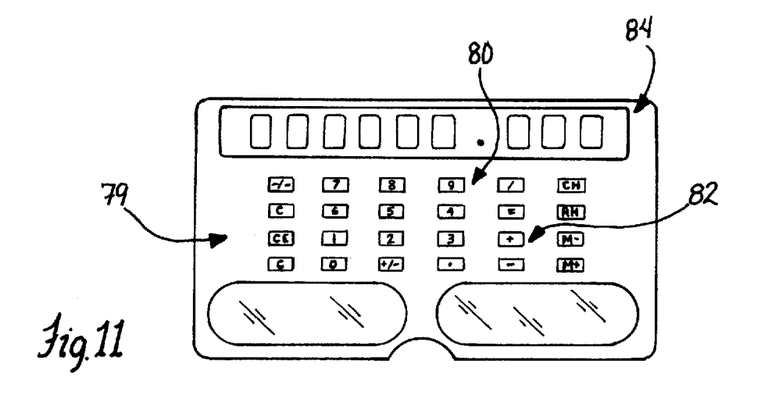
FIG. 11 is an elevational view of another form of the reading card showing low-profile calculator features incorporated therewith.

FIG. 11 shows the reading card 10 having calculator features incorporated therein including a keyboard 79 having low-profile numeric keys generally designated 80 and low-profile mathematic function key generally designated 82, and a low-profile or surface mount LCD display 84. This allows a user of the card 10 to perform calculations therewith without the need for a separate calculator while still retaining the small size of the card 10 thereof for fitting in their wallet 35, as previously described. Accordingly, the calculator card 10 allows a user, for example, to view an invoice therewith and calculate the tip owed to the service provider without resort to separate reading glasses and calculators.

Figure 13:
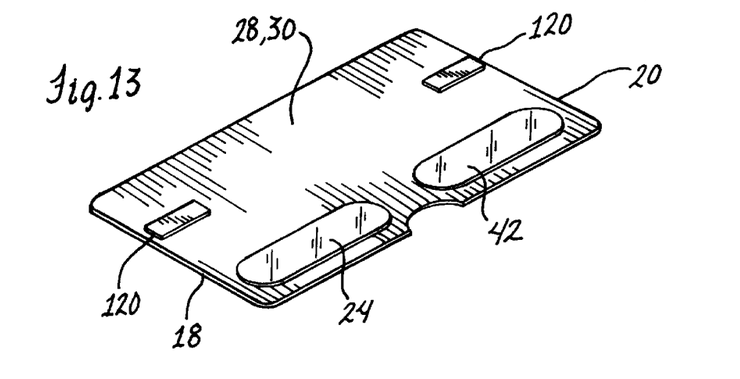
FIG. 13 is a perspective view of the reading card having magnets thereon.

FIG. 13 illustrates the reading card 10 with magnets 120 attached to one of the surfaces 28, 30 thereof. Preferably, there are two magnets 120 that are adjacent each end 18 and 20 of the card 12 so when it is secured to a metallic support surface when not in use, the card 12 is not loose at one of the ends thereof. In this manner, the card 12 can also be more effectively used to hold sheets of paper or pictures on the support or display surface, such as on a refrigerator door. The magnets 120 can be located on the surfaces 28, 30 at positions lacking the indicia 62 or the strip 66 where included with card 12. Where the space on the card 12 is limited, only one magnet 120 need be provided thereon.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

I claim:

1. A small reading card for fitting in a wallet or the like, the card comprising:
   a thin card member having opposite parallel surfaces with predetermined spacing therebetween under approximately 1/16", the card member being of a predetermined material so that the card member is substantially rigid;
   a plurality of outer edges of the card member and having a predetermined length and width with the length being approximately twice that of the width for defining a generally rectangular configuration for the card member;
   at least one inner edge of the card member distinct from the outer edges; and
   a reading lens having a predetermined configuration to provide the lens with a well-defined diopter rating, the lens being bounded by the inner edge for being carried by the card member to allow the card to be used for reading via viewing through the lens.

2. The card of claim 1 wherein the reading lens has opposite smooth surfaces having predetermined spacing therebetween to provide the lens with a thickness substantially equal to or slightly greater than that of the card member.

3. The card of claim 1 wherein the reading lens includes an outer periphery that is spaced from the card member outer edges.

4. The card of claim 1 wherein the reading lens has at least one outer peripheral edge, and the card member inner edge and the reading lens outer peripheral edge have a snap-fit interface therebetween.

5. The card of claim 4 wherein the reading lens has an outer obround configuration and the card member at least one inner edge has a complementary obround configuration corresponding to that of the reading lens obround edge.

6. The card of claim 1 wherein the card member includes a magnetic strip coded with predetermined information for being read by a card reader.

7. The card of claim 1 wherein the card member includes raised indicia formed integrally in at least one of the opposite parallel surfaces for transferring information from the card to another substrate.

8. The card of claim 1 wherein the diopter rating of the reading lens is one of 1.5, 2.0 and 2.5.

9. The card of claim 1 wherein the reading lens includes a pair of reading lenses adjacent one of the long edges of the card, and
   a bridge notch in the one long edge generally disposed intermediate the pair of lenses.

10. The card of claim 1 wherein the card member includes a low profile light source and power source electrically connected to the light source for emitting light to illuminate the viewing area through the lens.

11. The card of claim 1 wherein the card member includes a low profile voice recorder/playback device integrated therein including switches on one of the card surfaces for activating recording and playback functions of the device.

12. The card of claim 1 wherein the card includes a low profile keyboard including a plurality of numeric keys and mathematic function keys on one of the card surfaces for performing calculator functions, and
   a low profile LCD panel mounted to the one card surface to display data input via the numeric keys and results of calculations via the mathematic function keys.

13. A reading card comprising:
   a rectangular, relatively rigid card member;
   a window in the card member;
   a reading lens having a predetermined size for fitting in the card member window;
   a groove formed about one of the card member window and the reading lens; and
   an interfitting edge formed about the other of the card member window and the reading lens sized for being snap-fit in the groove to allow the card to be used for enhanced viewing through the lens thereof.

14. The reading card of claim 13 wherein the card member has top and bottom parallel surfaces and the reading lens has corresponding top and bottom surfaces so that with the reading lens snap fit in the card member window the top surface of the card member is slightly recessed from the reading lens top surface and the bottom surface of the card member is slightly recessed from the reading lenses bottom surface to provide the reading lens with a thickness greater than that of the card member.

15. The reading card of claim 14 wherein one of the card top and bottom surfaces has letters or numbers integrally pressed therein to be raised over the one card surface.

16. The reading card of claim 13 wherein the card member has a predetermined approximately 3 inches and a predetermined width of approximately 2 inches.

17. The reading card of claim 16 in combination with a small holder therefor sized for use with a wallet.

18. The reading card of claim 13 wherein the reading lens is of a material that is light refractive with a predetermined diopter rating.

19. The reading card of claim 18 wherein the reading lens has smooth opposite surfaces for refracting light therethrough.

20. The reading card of claim 13 wherein the groove and the interfitting edge include cam surface portions that cooperate to provide the snap fit between the lens and the card member.

21. The reading card of claim 20 wherein the card member has parallel opposite surfaces and the cam surface portions are oriented oblique to the card member surfaces.

22. The reading card of claim 13 including a light source mounted to the card member at a predetermined position thereon relative to the reading lens for illuminating the viewing area provided by the lens.

* * * * *

UNITED STATES PATENT AND TRADEMARK OFFICE
CERTIFICATE OF CORRECTION

PATENT NO. : 6,390,372 B1 Page 1 of 1
DATED : May 21, 2002
INVENTOR(S) : Waters

It is certified that error appears in the above-identified patent and that said Letters Patent is hereby corrected as shown below:

Column 10,
Line 46, after "predetermined", insert -- length of --.

Signed and Sealed this

Thirty-first Day of December, 2002

JAMES E. ROGAN
*Director of the United States Patent and Trademark Office*